United States Patent [19]

Godsoe, Sr. et al.

[11] Patent Number: 4,705,136
[45] Date of Patent: Nov. 10, 1987

[54] MOTOR VEHICLE SAFETY SYSTEM

[76] Inventors: Donald E. Godsoe, Sr.; Donald E. Godsoe, Jr., both of 76 Lexington St., Auburndale, Mass. 02166

[21] Appl. No.: 847,424

[22] Filed: Apr. 2, 1986

[51] Int. Cl.[4] .............................................. B60R 21/34
[52] U.S. Cl. .................................... 180/277; 180/271
[58] Field of Search ............... 180/271, 272, 273, 268, 180/269, 286, 277

[56] References Cited

U.S. PATENT DOCUMENTS 3,985,196 10/1976 Deschamps ........................ 180/271
4,397,371 8/1983 Lynnes et al. ...................... 180/271

Primary Examiner—Richard A. Bertsch
Attorney, Agent, or Firm—Jerry Cohen

[57] ABSTRACT

A passenger carrying motor vehicle safety system for monitoring a space underneath the vehicle includes a photodetector assembly for generating a light beam and sensing interruptions in the light beam. A switch which is energized by the opening of the passenger door of the motor vehicle, activates the safety system. Holding contacts maintain the system in the activated state until the system is reset by the driver. A system reset switch, which is located within reach of the bus driver on the inside of the motor vehicle, is provided to reset the system so long as it has not been tripped. A trip reset switch, which is located on the outside of the motor vehicle, is provided to reset the system after it has been tripped.

19 Claims, 3 Drawing Figures

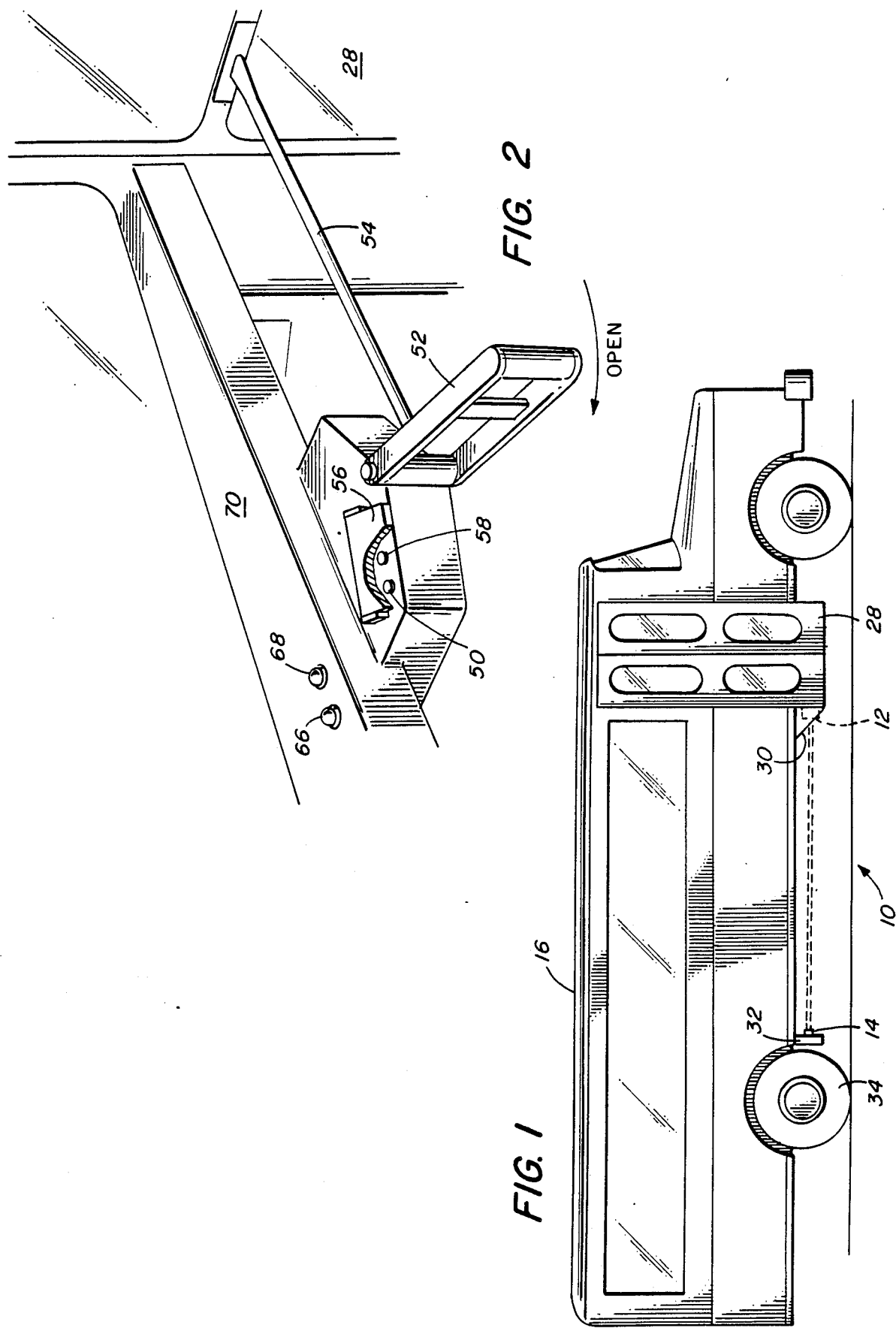

MOTOR VEHICLE SAFETY SYSTEM

BACKGROUND OF THE INVENTION

1. Field of the Invention:

The present invention relates to motor vehicle safety systems and, more particularly, is directed towards a safety system for monitoring the space under a bus.

2. Description of the Prior Art:

There are numerous applications which require a warning or shut-off signal for a machine. In recent years, audible warning devices have been installed on commercial vehicles to provide a warning that the vehicle is moving backwards. The loud warning signal is sufficient to alert people behind the vehicle to get out of the way. However, there is no warning to the driver that someone is in danger of being hit. In the case of a school bus, there is no warning signal to alert children that the bus is about to move forward and there is no signal to warn the driver that a child may have crawled under the bus in order to retrieve something. As a result, many children have been seriously hurt and killed by school buses. A need exists for a monitoring, warning and disabling system for a school bus which will monitor the space under a bus, provide a warning signal that there has been an intrusion into the monitored space and disable the bus so that it cannot be moved.

SUMMARY OF THE INVENTION

It is an object of the present invention to provide a safety system for a motor vehicle which will warn a driver that it is not safe to proceed and will disable the vehicle to prevent it from being moved.

It is another object of the present invention to provide a system for monitoring the space under a bus, generating a warning signal that there has been an intrusion into the monitored space, and disabling the bus to prevent the bus from being moved until the system is reset by the driver.

It is further object of the present invention to provide a motor vehicle safety system, particularly a school bus safety system, which is activated any time the bus door is opened and remains activated until it is reset by the bus driver. The bus safety system includes a photodetector assembly which is mounted behind the front door of the bus and a reflector which is mounted in front of the rear wheels. A light beam which is generated by the photodetector assembly, reflected by the reflector and sensed by the photodetector assembly monitors the space between the front door and the rear wheels. In the event that the beam is interrupted, the system is tripped and warning indicators are activated and the bus is disabled. The system is reset from the outside of the bus by the driver.

The invention accordingly comprises the system, together with its parts, elements and interrelationships, that is exemplified in the following disclosure, the scope of which will be indicated in the appended claims.

BRIEF DESCRIPTION OF THE DRAWING

A fuller understanding of the nature and objects of the present invention will become apparent upon consideration of the following detailed description taken in connection with the accompanying drawings, wherein:

FIG. 1 is a side view of a bus having a bus safety system made in accordance with the present invention;

FIG. 2 is a perspective view showing a portion of the dashboard which contains switches for activating the bus safety system and providing an indication of the system's status.

DETAILED DESCRIPTION OF PREFERRED EMBODIMENTS

Figure 3:
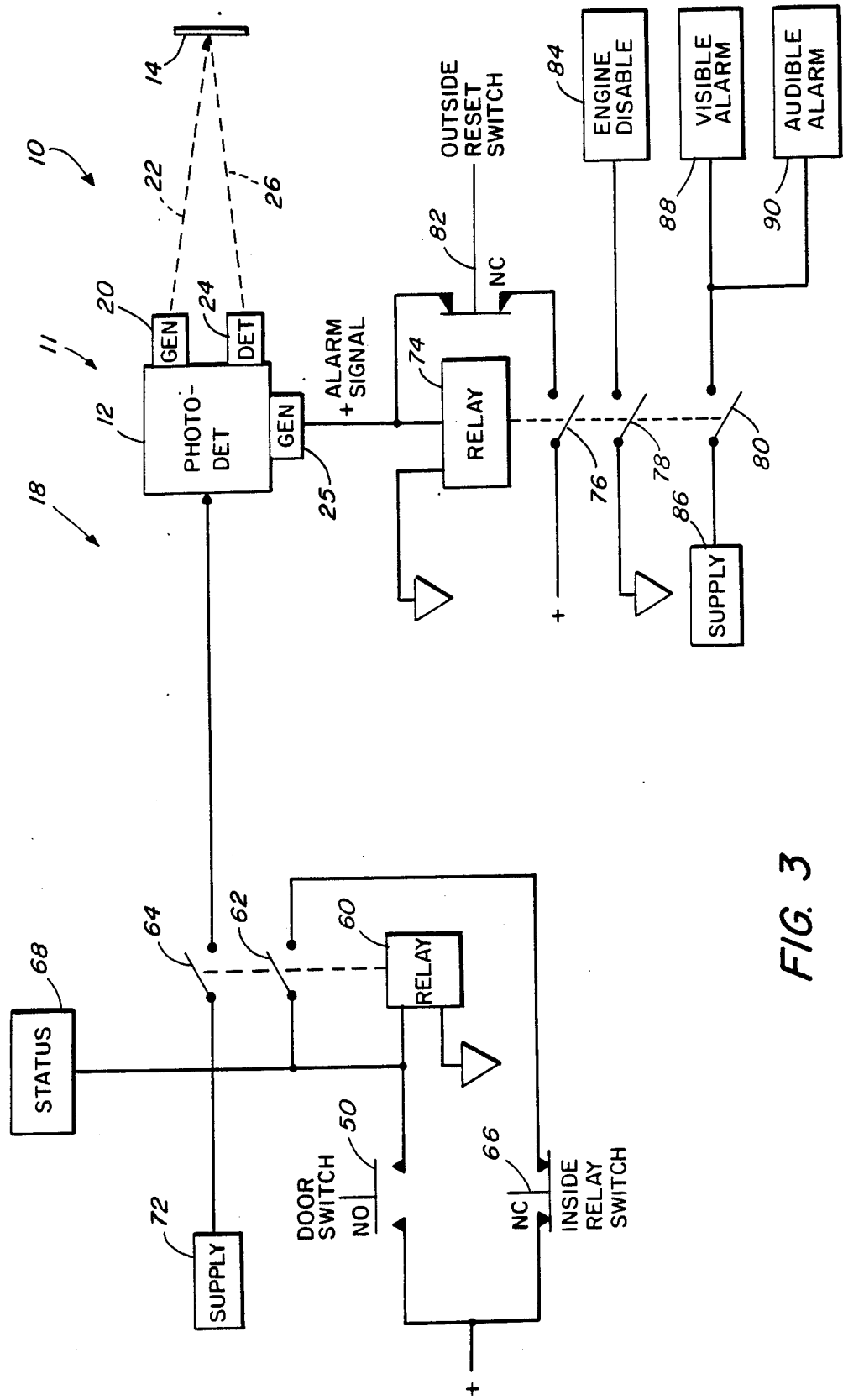
FIG. 3 is a block and schematic diagram of the bus safety system of FIG. 1.

Referring now to the drawings, particularly FIG. 1, there is shown a motor vehicle safety system 10 made in accordance with the teachings of the present invention. Vehicle safety system 10, which is particularly adapted for a school bus 16, includes a photodetector assembly 11 for monitoring the area underneath the school bus and electronic control circuitry 18 (FIG. 3) for enabling the system and disabling the bus in the event that the system is tripped.

In the illustrated embodiment, photodetector assembly 11 includes a photodetector 12 and a reflector 14. Photodetector 12 includes a beam generator 20 for generating a light beam 22, and a detector 24 for sensing a reflector light beam 26, and an alarm generator 25 for generating an alarm or warning signal when the light beam is interrupted. The light beam 22 is directed towards reflector 14 and the reflected beam 26 is directed towards the detector 24. When the reflected beam is interrupted, an alarm signal is generated by alarm generator 25.

As shown in FIG. 1, photodetector 12 is mounted on the outside of the bus 16 behind the passenger or front door 28, preferably, protected by a plate 30. The reflector 14 is mounted on a rigid tire flap or plate 32 which is mounted to the frame of the bus in front of the rear wheels 34. Plate 32 is operative to prevent dirt and the like which is thrown from rear wheels 34 from hitting the reflector 14.

Bus safety system 10 is activated by a switch 50 which is energized when front door 28 is opened. As shown in FIG. 2, a handle 52 is connected to a rod 54 which is attached to the front door 28. As handle 52 is pulled towards the bus driver in order to open the front door 28, the handle presses against a pivotally mounted plate 56 and pushes it against switch 50 and a switch 58. Switch 58 activates the flashing red lights on the bus to warn motor vehicle drivers that children may be getting on or off the bus. Switch 50 activates safety system 10.

As shown in FIG. 3, when switch 50, a normally opened, monetary reset switch, is energized by opening of the front door 28, a relay 60 is energized and its contacts 62, 64 close. Contacts 62 are holding contacts which keep relay 60 energized via a normally closed, momentary reset switch 66. A status indicator 68, which is mounted on the dashboard 70 beside switch 66, provides an indication that bus safety system 10 has been activated. Power from a supply 72 is applied to photodetector assembly 11 via closed contacts 64 and safety system 10 is activated or enabled.

When photodetector assembly 11 is turned-on by closing of contacts 64 and application of power thereto, light beam 22 is directed towards reflector 14 and the reflected beam 26 is sensed by detector 24. It will be readily appreciated that bus safety system 10 monitors the space underneath the bus between the front door 28 and the rear wheels 34 on the passenger's side. In an alternate embodiment, a dual system is used to monitor the space between the front wheel and rear wheels on the driver's side of the bus as well as on the passenger's side. In a further embodiment, a beam generator is positioned behind the front door 28 and the detector is positioned in front of the rear wheel, thus eliminating the need for a reflector.

In the event that there is an interruption in the light beam sensed by detector 24, an alarm signal is generated by alarm generator 25. The alarm signal energizes a relay 74 and contacts 76, 78 and 80 thereof close. Contacts 76 are holding contacts which maintain relay 74 in its energized state via a normally closed, momentary reset switch 82. Reset switch 82 is mounted outside of the bus so that the driver must exit the bus in order to reset the system. Closed contacts 78 of relay 74 disable the engine of the bus, for example, by grounding the ingition coil 84 in the case of a gasoline engine or deenergizing the air solenoid in the case of a diesel engine. Closed contacts 80 apply power from a source 86 to a visual indicator 88 and an audible 90, for example, a visual indicator such as lights and/or an audible indicator such as a horn.

In use, as previously indicated, bus safety circuit 10 is activated when the passenger door or front door 28 of school bus 16 is opened. When the driver pulls on handle 52, switch 50 is closed and relay 60 is energized. Safety system 10 is activated by application of power from supply 72 to photodetector 12 via closed contacts 64 of relay 60. Relay 60 is maintained in its energized state by closed holding contacts 62. If there has been no intrusion of the monitored space between the front door 28 and rear wheels 34, and the front door 28 has been closed, the driver can reset the system by energizing or opening switch 66 and removing the voltage from relay 60. In consequence, relay 60 is deenergized, contacts 62 and 64 open and the bus safety system 10 is deactivated or disarmed. If front door 28 has not been closed, switch 50 remains closed and the safety system 10 cannot be reset because the voltage is applied to relay 60 via the closed contacts of switch 50.

In the event that there has been an intrusion of the monitored space, for example, a child has crawled under the bus to retrieve something, there is an interruption in the reflected light beam 26 sensed by detector 24. In consequence, the bus safety system 10 is tripped and alarm generator 25 generates an alarm signal which energizes relay 74. The closed contacts 78 of relay 74 disable the bus engine and closed contacts 80 activate the visual and audible alarm warnings 88 and 90, respectively. Contacts 76 keep relay 74 energized until the bus driver goes outside and energizes reset switch 82. In this way, the driver must go outside in order to reset the system once it has been tripped.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A safety system for monitoring the area underneath a passenger motor vehicle, said system comprising:
   (a) a photodetector means for generating a light beam, for sensing the presence of said light beam and for generating an alarm signal in response to an interruption in said light beam;
   (b) source means for generating power;
   (c) first means for applying said power to said photodetector means and activating said photodetector means; and
   (d) second means responsive to said alarm signal generated by said photodetector means for providing a warning that said light beam has been interrupted;
   (e) said first means having energized and deenergized states, said first means being energized when the passenger door is opened, said photodetector means activated when said first means is in its energized state; and
   (f) said second means having energized and deenergized states, said second means being activated to its energized state by said alarm signal generated by said photodetector means and;
   (g) safety reset means proximate to said light bean which returns said second means to its said deenergized state when said interruption of said light beam no longer exists and said alarm signal is no longer generated and said underneath of said vehicle can be viewed by a person operating said safety reset means to ensure safety.

2. The safety system as claimed in claim 1 wherein said first means includes first switch means and first relay means, said first switch means responsive to opening of the passenger door, said first switch means energizing said first relay means when the door is opened, said first relay means having first contacts through which said power is applied to said photodetector means.

3. The safety system as claimed in claim 2 wherein said first relay means includes first holding contacts for maintaining said first relay means in an energized state.

4. The safety system as claimed in claim 3 wherein said first means includes first reset switch means operatively connected to said first holding contacts and said first relay means for resetting said first relay means.

5. The safety system as claimed in claim 4 wherein said second means includes second relay means, said second relay means energized by said alarm signal, said second relay means having second holding contacts for maintaining said second relay means in an energized state, and said safety reset means includes second reset switch means operatively connected to said second holding contacts and said second relay means for resetting said second relay means.

6. The safety system as claimed in claim 5 including warning means operatively connected to said second means for generating a warning signal when said second means is energized by said alarm signal.

7. The safety system as claimed in claim 1 wherein said first means includes first switch means and first relay relay means, said first switch responsive to opening of the door, said first switch means energizing said first relay means when the door is opened, said first relay means having first contacts through which said power is applied to said photo detector means; and said second means includes second relay means, said second relay means energized by said alarm signal, said second relay means having second holding contacts for maintaining said second relay means in an energized state, and said safety reset means includes second reset switch means operatively connected to said second holding contacts for resetting said second relay means.

8. The safety system as claimed in claim 7 wherein said first switch means is mounted inside of the motor vehicle and said second switch means is mounted outside of the motor vehicle.

9. The safety system as claimed in claim 1 including reflector means, said photodetector means mounted behind the front wheels of the motor vehicle and said reflector means mounted in front of the rear wheels of the motor vehicle, said light beam generated by said photodetector means directed at said reflector means, said reflector means positioned to reflect said light beam towards said detector means.

10. A school bus safety system for monitoring the area underneath a school bus between the front door and rear tire, said system comprising:
  (a) photodetecting means including beam generator means, detector means and alarm generator means, said beam generator means generating a light beam, said detector means sensing interruptions in said light beam, said alarm generator means generating an alarm signal when interruptions in said light beam are sensed by said detector means, said generator means and said detector means positioned to monitor the area between the front door and the rear wheels of the school bus;
  (b) first switch means responsive to the opening of the front door, said first switch means having opened and closed states, said first switch activating said photodetector means when the front door is opened;
  (c) first relay means responsive to said first switch means, said first relay means having energized and deenergized states, said first relay being energized when the front door is opened, said first relay means including first holding contacts for maintaining said first relay means in said energized state;
  (d) first reset switch means operatively connected to said first relay means for resetting said first relay means;
  (e) second relay means responsive to said alarm signal, said first relay means having energized and deenergized states, said second relay means being energized by said alarm signal, said second relay means including second holding contacts for maintaining said second relay means in said energized state;
  (f) second reset switch means operatively connected to said second relay means for resetting said second relay means;
  (g) warning means operatively connected to said second relay means for providing an indication that said alarm signal has been generated; and
  (h) disable means operatively connected to said second relay means for disabling the bus when said alarm signal has been generated.

11. The safety system as claimed in claim 10 wherein said first reset switch means is mounted inside of the bus within reach of the driver and wherein said second reset switch means is mounted outside of the bus.

12. The safety system as claimed in claim 11 wherein said first relay means includes first contact means which close when said first relay means is energized, said photodetector means energized via said closed first contacts.

13. The safety system as claimed in claim 12 wherein said first relay means includes first holding contacts for maintaining said first relay means in an energized state, said first reset switch means operatively connected to said first holding contacts and said first relay means for resetting said first relay means.

14. The safety system as claimed in claim 13 wherein said second relay means, includes second holding contacts for maintaining said second relay means in an energized state, said second reset switch means operatively connected to said second holding contacts for resetting said second relay means.

15. The safety system as claimed in claim 10 including reflector means, said photodetector means mounted behind the front door of the bus and said reflector means mounted in front of the rear wheels of the bus, said light beam generated by said photodetector means directed at said reflector means, said reflector means positioned to reflect said light beam at said detector means.

16. A school bus safety system for monitoring the area underneath a school bus between the front door and rear tire, said system comprising:
  (a) photodetecting means including beam generator means, detector means and alarm generator means, said beam generator means generating a light beam, said detector means sensing interruptions in said light beam, said alarm generator means generating an alarm signal when interruptions in said light beam are sensed by said detector means, said generator means and said detector means positioned to monitor the area between the front door and the rear wheels of the school bus;
  (b) reflector means, said photodetector means mounted behind the front door of the bus and said reflector means mounted in front of the rear wheels of the bus, said light beam generated by said photodetector means directed at said reflector means, said reflector means positioned to reflect said light beam at said detector means.
  (c) first switch means responsive to the opening of the front door, said first switch means having opened and closed states, said first switch activating said photodetector means when the front door is opened;
  (d) first relay means responsive to said first switch means, said first relay means having energized and deenergized states, said first relay being energized when the front door is opened, said first relay means including first holding contacts for maintaining said first relay means in said energized state;
  (e) first reset switch means operatively connected to said first relay means for resetting said first relay means;
  (f) second relay means responsive to said alarm signal, said first relay means having energized and deenergized states, said second relay means being energized by said alarm signal, said second relay means including second holding contacts for maintaining said second relay means in said energized state;
  (g) second reset switch means operatively connected to said second relay means for resetting said second relay means; and
  (h) warning means operatively connected to said second relay means for providing an indication that said alarm signal has been generated; and 17. The safety system as claimed in claim 16 wherein said first reset switch means is mounted inside of the bus within reach of the driver and wherein said second reset switch means is mounted outside of the bus.

18. The safety system as claimed in claim 17 wherein said first relay means includes first contact means which close when said first relay means is energized, said photodetector means energized via said closed first contacts and wherein said first relay means includes first holding contacts for maintaining said first relay means in an energized state, said first reset switch means operatively connected to said first holding contacts and said first relay means for resetting said first relay means.

19. The safety system as claimed in claim 18 wherein said second relay means, includes second holding contacts for maintaining said second relay means in an energized state, said second reset switch means operatively connected to said second holding contacts for resetting said second relay means.

* * * * *